MAGNETIC SOUND RECORDING AND REPRODUCING APPARATUS

Filed March 22, 1945 3 Sheets-Sheet 1

INVENTOR.
Terry M. Shrader
BY C. D. Tuska
ATTORNEY

INVENTOR.
Jerry M. Shrader
BY C. D. Tuska
ATTORNEY

May 9, 1950 T. M. SHRADER 2,507,385

MAGNETIC SOUND RECORDING AND REPRODUCING APPARATUS

Filed March 22, 1945 3 Sheets-Sheet 3

INVENTOR.
Jerry M. Shrader
BY C. D. Tuska
ATTORNEY

Patented May 9, 1950

2,507,385

UNITED STATES PATENT OFFICE 2,507,385

MAGNETIC SOUND RECORDING AND REPRODUCING APPARATUS

Terry M. Shrader, Indianapolis, Ind., assignor to Radio Corporation of America, a corporation of Delaware Application March 22, 1945, Serial No. 584,197

5 Claims. (Cl. 179—100.2)

This invention relates to magnetic sound recording and reproducing apparatus and has special reference to the provision of improvements in reels and reeling mechanisms for wire and tape records.

In the usual "telegraphone" wherein the wire or tape record passes from a storage reel to the sound-head and thence to a take-up reel it is customary to provide some means for maintaining the wire under uniform tension. The problem of achieving uniform tension throughout the playing and recording intervals is obviously complicated by the continuously variable difference in the quantity of wire or tape on the storage and take-up reels, and hence by the differences in the effective diameters of the said reels. Various means, such as braking devices, plural motors, etc., have been proposed as a solution of this problem. Irrespective of the advantages claimed for the record-tensioning systems of the prior art it may be said, generally, that they occupy far more space in the unit than is desirable and, furthermore, are quite complicated and expensive.

Accordingly, the principal object of the present invention is to provide a simple, inexpensive and trouble-free record-tensioning mechanism for "telegraphones" and analagous phonographs, and one capable of being applied to a record-cartridge without increasing the overall dimensions of the cartridge or its reels, and without complicating the electrical connections to the recording and reproducing apparatus.

Another and imporant object of the present invention is to provide an improved plural-wire telegraphone, and one suitable for use as a coin-operated phonograph, or in a vending machine, announcing system or dictating machine, and for other applications wherein rewinding time is not always available and instantaneous operation is either necessary or desirable.

Still another object of the present invention is to provide an improved reeling mechanism for magnetic wire recordings, and one wherein the wire is caused to be evenly distributed on the reels without resort to the use of a reciprocating wire-guiding mechanism.

Figure 1:
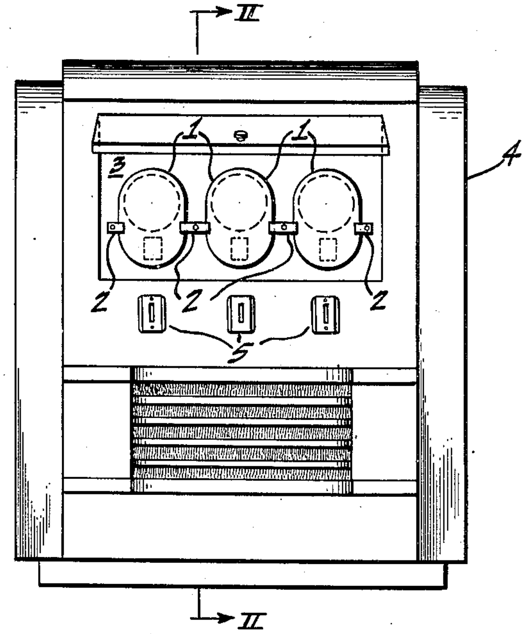
Figure 2:
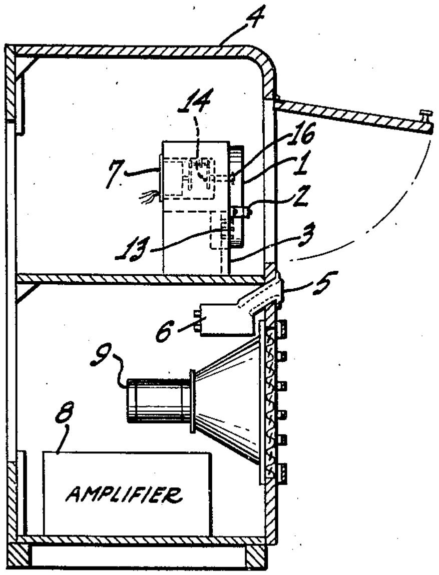
Figure 3:
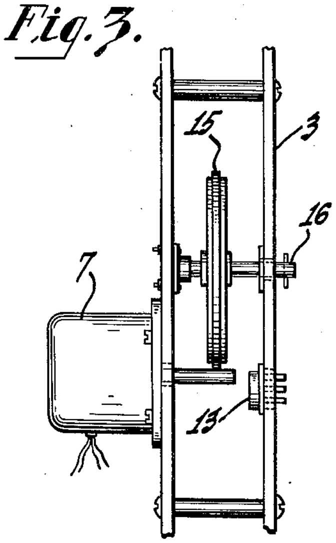
Figures 4, 5:
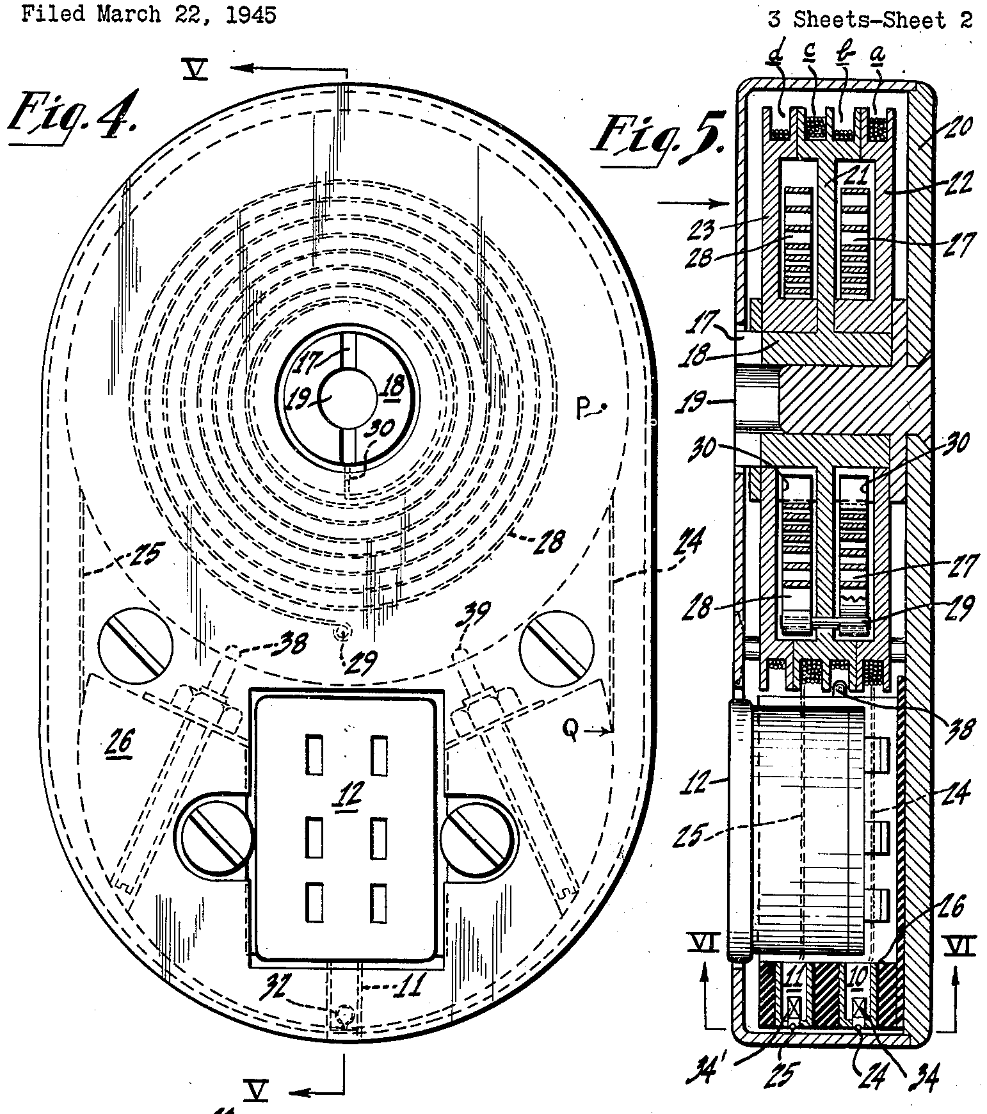
Figure 6:
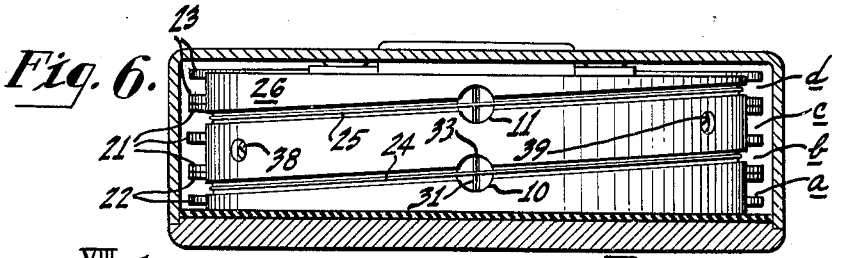
Figures 7, 8:
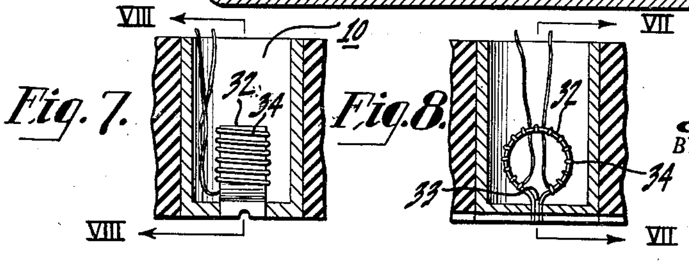
Figure 9:
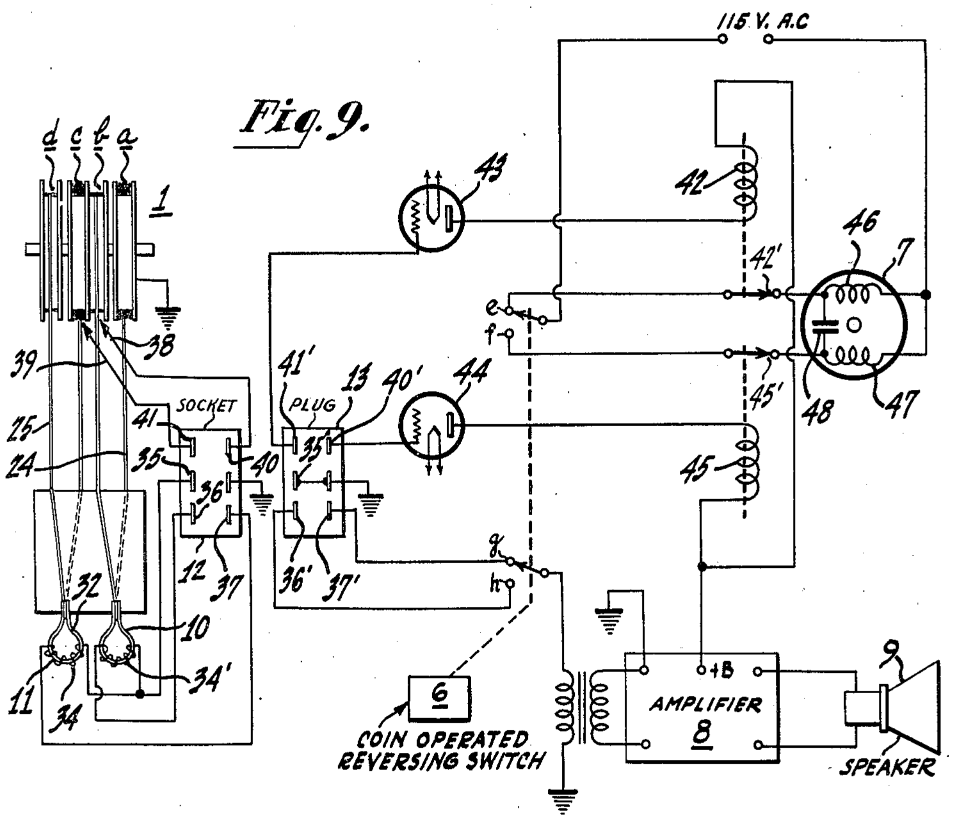

Other objects and advantages, together with certain preferred details of construction will be apparent and the invention itself will be best understood by reference to the following specification and to the accompanying drawing, wherein:

Fig. 1 is a front elevation of a coin-operated magnetic phonograph, or telegraphone, including a number of plural-wire record-cartridges, Fig. 2 is a sectional view taken on the line II—II of Fig. 1, Fig. 3 is an elevational view of a preferred form of gearing for rotating the reels of a record cartridge, Fig. 4 is a rear elevational view of one of the plural-wire record-cartridges shown in Figs. 1 and 2, Fig. 5 is a sectional view taken on the line V—V of Fig. 4, Fig. 6 is a partial sectional view taken on the line VI—VI of Fig. 5, Fig. 7 is an enlarged partial sectional view taken on the line VII—VII of Fig. 8, of one of the magnetic pick-up units shown in Figs. 5 and 6, Fig. 8 is a partial sectional view taken on the line VIII—VIII of Fig. 7 and Fig. 9 is a wiring diagram for the coin-operated phonograph of Figs. 1 to 7 inclusive.

In the embodiment of the invention which has been selected for purposes of illustration a number (in this case, three) of record-cartridges, indicated generally at 1, are removably affixed as by means of latches 2 (see Fig. 1) to a concealed panel 3 in a coin-operated phonograph 4. This cabinet 4 is provided at the front with a coin slot 5 and contains a coin operated switch 6, a suitable motor 7 for each cartridge, an amplifier 8 and a loudspeaker 9. Each cartridge 1 contains, in addition to the wire reeling mechanism (later described), a pair of sound heads or magnetic recording or pick-up units 10 and 11 respectively, and a socket type connector 12 through which electrical connections are made to the amplifier 8 and loudspeaker 9 by means of a six-pronged plug 13 which projects from the panel 3 in the cabinet 4.

The motor 7 is preferably of the synchronous-capacity-type, although it may be of any other constant speed type which can be reversed while running. This motor 7 serves to drive a reeling mechanism, later described, when the cartridge is in place and, to this end, is connected through suitable gearing 14 (Fig. 2) or through a rubber-tired wheel 15 (Fig. 3) to a keyed shaft 16 which projects beyond the front surface of the panel 3 in a position to engage a complementarily shaped kerf 17 (Figs. 4 and 5) on the exposed end of a a sleeve or hub 18 which is free to rotate on a stationary shaft or axle 19 which is staked in a base plate 20 in the cartridge 1.

If an ordinary (i. e. single wire) magnetic recorder is called upon to replay a wire record, an interval sufficiently long to allow for rewinding the wire must elapse before the record can be replayed. This objectionable feature of the prior art is obviated, in accordance with the present invention, by the provision of duplicate recordings which are so arranged that while one record is being played the other is simultaneously being silently rewound. To this end, referring now particularly to Fig. 5, the cartridge 1 contains three reels, having a common axis of rotation and including a center reel 21 and two outer reels 22 and 23 respectively. The center reel 21 is integral with the hub or sleeve 18 which engages the driving shaft 16 (Fig. 3) when the cartridge is mounted on the panel 3, and is provided with two circumferential slots or grooves *b* and *c* into which two separate steel wires 24 and 25 can be wound. The outer reels 22 and 23 are each provided with but a single groove *a* and *d*, respectively, and are mounted for independent rotation upon the hub or sleeve 18 of the center reel 21.

The trailing end of the wire 24 is secured to the reel 22 and the said wire is wound in the counter-clockwise direction (as viewed by an observer looking in the direction of the arrow adjacent to Fig. 5) to fill the groove *a*. The leading end of this wire is led in the same (counter-clockwise) direction in a groove around a guide-block 26 over the pick-up unit 10 and is secured in the adjacent groove *b* in the central reel 21. Thus, when the wire is drawn from its "storage" groove *a* in the reel 22 into its "take-up" groove *b* on the reel 21 the magnetic-recording on the said wire will be picked-up by the pick-up or transducer unit 10. This reeling movement is achieved by rotating the reel assembly counter-clockwise, as viewed in the direction of the arrow, Fig. 5.

The other steel wire, 25, as here shown, is wound for the most part in its "take-up" groove *c* in the center reel 21. It is wound in the same (counter clockwise) direction as the wire 24 is wound in groove *a*, but the recording on the wire 25 is reversed when it is in the groove *c*. This wire 25 extends around the guide block 26 over the other pick-up unit 11 into its "storage" groove *d* in the reel 23. It should be noted that when this wire record 25 is completely wound in its storage groove *d* the beginning of the phonograph recording thereon lies adjacent to the top of the said groove, hence, to play the said recording the reel assembly must be driven in the clockwise direction. The manner in which the separate wires 24 and 25 are reeled and unreeled will be apparent from the following.

It will be observed that when the reels 21, 22 and 23 are assembled in the manner shown in Fig. 5 with their grooved flanges arranged in abutting relation, there are two compartments within the assembly and that each compartment contains a spring 27 and 28, respectively. One end (say the outer end) of each spring is fastened to a pin 29 carried by the center reel 21 and the other ends are connected, respectively, in slots 30 in the hubs of the outer reels 22 and 23 and thus couple the driving reel 21 in torque transfer relation with both of the reels 22 and 23. These springs 27 and 28 spiral outwardly in opposite directions as viewed from either face of the cartridge. Thus, as shown in Fig. 4, the spring 28 spirals outwardly (from the slot 30) in the counter-clockwise direction, and it will be apparent upon close inspection of Fig. 5 that the other spring 27 spirals outwardly in the opposite direction (i. e. clockwise).

The springs 27 and 28 being wound in opposite directions will maintain tension on the wires 24 and 25 irrespective of the direction of the movement applied to the center reel 21 by the driving shaft 16. That this is so will be more readily apparent when it is observed that when the reel 21 (and hence the reel assembly) is driven in the counter-clockwise direction (so that the center reel 21 pulls the wire 24 from the storage groove *a* to the take-up groove *b*) the biasing force of the spring 27 is exerted in the opposite (clockwise) direction upon the reel 22 and thus maintains the wire 24 under tension. When the wire 24 is piled higher in groove *a* than in groove *b*, (or when the effective diameter of the reel 22 is greater than that of reel 21) reel 22 runs relatively slower than reel 21 and some of the energy stored in the spring 27 is released. When the wire is piled to the same height in grooves *a* and *b* reels 21 and 22 run at the same speed. When the wire is piled higher in groove *b* than in *a*, (or when the effective diameter of reel 21 is greater than that of reel 22) reel 22 runs relatively faster than reel 21 and energy is returned to the spring 27.

As the reel assembly is driven in the same (counter-clockwise) direction reel 23 pulls the wire 25 from its take-up groove *c* to the storage groove *d* by means of the biasing force of spring 28. This biasing force also keeps the wire under tension as it is led around the guide block 26 and is sufficient to overcome the friction between the wire and the guide groove through which the wire passes in its journey between the reel grooves *c* and *d*. When the wire 25 is piled higher in groove *c* than in groove *d* (or when the effective diameter of reel 21 is greater than that of reel 23) reel 23 runs relatively faster than reel 21 and some of the energy stored in the spring is released. The two reels run at the same speed when the wire 25 is piled to equal heights in grooves *c* and *d*. When the wire is piled higher in groove *d* than in *c*, reel 23 runs relatively slower than reel 21 and energy is returned to the spring 28. The actual speed of reel 21, driven by the motor 7, remains constant. The actions of reels 22 and 23 are independent of each other, though both reels are coupled in torque transfer relation with the center driving reel 21 by means of the springs 27 and 28 as well as by the wires 24 and 25.

When the rotation of the assembly is changed to clockwise the above described movements are relatively reversed, as will be understood.

The springs in maintaining sufficient tension in the wires, take up or give up, as the case may be, considerable amounts of slack that would occur due to differences in effective reel diameters. In the present case the slack involved is represented by a difference in rotation of about five complete turns. In the case of longer playing records and larger devices, the differences would be much greater. Since the springs have to do more than merely maintain tension, they are of several convolutions, the number of convolutions and other feature of spring design depending upon such factors as reel diameter, groove width, wire diameter, etc.

In the present arrangement no reciprocating wire guide for causing the wire to pile up evenly in the reel grooves, as used by others, past or present, is necessary as a result of the invention. The minimum distance between the point P of tangency to the oncoming wire and the point Q on the guide block 26, as well as the maximum widths of the reel grooves, are so related, for a given wire diameter range, that the wire piles up evenly. In the given case the minimum distance was about one and one quarter inches. The maximum slot width was one tenth of an inch. The wire was four mils of an inch in diameter.

The guide block 26 is constituted of insulating material and is provided with two shallow grooves in wihch the separate wires 24 and 25 ride from the storage grooves *a* and *d* to the take-up grooves *b* and *c* respectively. In their journey from the storage reels to the take-up reels the wires 24 and 25 ride over the sound-heads 10 and 11 respectively. These sound-heads, pick-up units or "transducers," are preferably of the type claimed by Henry E. Roys in copending application Ser. No. 591,071, filed April 30, 1945, now U. S. Patent No. 2,469,444, issued May 10, 1949. In this event the said units may be similar to the one shown in detail in Figs. 6, 7 and 8.

The pick-up units are of duplicate construction, hence a description of one unit (10) will serve as a description of the other (11). Each unit comprises a small brass or other non-magnetic cylinder or cup 10 having a slot 31 therein which extends across the path of the wire. The cup contains a ribbon of highly permeable steel or other magnetic material bent in the form of a loop 32 and having its ends bent downwardly and wedged into the slot 31 preferably with a non-magnetic spacer 33 which may comprise a wafer of brass, the pole ends and the brass separator being soldered in place in the slot. The magnetic ends of the loop 32 are presented successively to points or signals along the wire and comprise the "pole-pieces" of the transducer or pick-up-recorder. A small signal-coil 34 is wrapped about the ribbon or loop 32 as a core, within the brass cup and, as indicated in Fig. 9, one end of each coil 34 (34') is connected to a terminal 35 in the socket 12 and the other ends are connected to separate terminals 37 and 36, respectively, in the said socket.

The insulating guide block 26 also serves as a support for two adjustable electrical contacts 38 and 39 (see Fig. 4) for stopping the reversible motor 7 before the steel wires 24 and 25 are completely unwound from any of the reels. As shown more clearly in Figs. 4 and 6 these contacts 38 and 39 are mounted in separate holes which extend upwardly from the bottom of the guide-block and, as indicated in Fig. 9, are provided with terminal wires which extend to separate prongs 40 and 41, respectively, in the socket 12. In the instant case the stopping contacts 38 and 39 extend into the take-up grooves *b* and *c*, respectively, on the center reel 21 and, as will hereinafter more fully appear, operate relays which stop or reverse the motor 7.

Referring now to Fig. 9 wherein it is assumed that the cartridge 1 is connected through its socket 12 to the plug 13. With the switch 6 on the indicated contact points *g* and *e* the pick-up unit 11 is energized and the reel assembly will be understood to be rotating clockwise (as viewed in Fig. 4) so that the magnetic record or wire 25 is being reeled in the "playing direction" i. e. off its "storage" groove *d* into its "take-up" groove *c*. As previously pointed out, the stopping contact 39 for the wire 25 projects a short distance into the take-up groove *c* and, as here shown in connected (by means of its socket and plug terminals 41, 41') to an electromagnetic relay 42. A vacuum tube amplifier 43 is preferably connected as shown, in this relay circuit whereby the slightest contact between 39 and the wire 25 operates the said relay 42 opening contacts 42'. When the wire 25 piles up in the storage groove *c* to a height sufficient to touch the contact 39 the relay 42 operates to open the circuit of the motor 7 and halts the above described reeling movement.

If the switch 6 is now thrown to its other contact points *h* and *f* (as by a coin-operated mechanism), the other pick-up unit (10) is energized, the motor 7 is started in the reverse direction. Relay 42 closes as soon as the turns of wire in groove *c* recede from contact 39. The reel assembly is now being driven (counter-clockwise) in the "playing direction" for the magnetic wire-record 24. This continues until the wire 24 piles up in its take-up groove *b* and touches the stopping contact 38, thereby energizing the amplifier 44 and relay 45, opening contacts 45' and stopping the motor 7 again. Obviously, the cycle may be repeated upon the insertion of another coin, in which case the switch 6 is thrown automatically back to the first position. The pick-up units 11 and 10 are connected in turn to the audio amplifier 8 (and hence to loudspeaker 9), as determined by the position of the switch 6 on points *g* and *h*.

When the motor 7 runs in the first direction, with the switch in the position shown, both of the relay contacts 42' and 45' will be closed, as shown. The current flows through the motor coil 46 from one side of the 115 volt A. C. source through contacts 42' and *e* back to the other side of the line. It also flows from the 115 volt A. C. source through the coil 47 and the condenser 48 in series, through contacts 42' and *e* back to said other side of the line, for the first motor movement. For reversal, current flows from one side of 115 volt through coil 47, also through 46 and 48 in series, and through contacts 45' and *f* back to the other side of 115 volt. (This is conventional in the operation of synchronous capacity-type motors.) It is of course obvious that, if desired, electrical micro-switches may be provided and mechanically actuated by physical contact with the wire or wires 24 and 25 as they pile up in the reel grooves.

From the foregoing it will be apparent that the present invention provides an improved "telegraphone" and one incorporating a record-tensioning mechanism which, by reason of the simplicity and economy of its parts, lends itself readily for use in both single and plural record cartridges.

What is claimed is:

1. A reel assembly comprising three reels mounted adjacent to one another for independent movement about a common axis, a plurality of spiral springs each connected at one end to the central reel and the other ends of said springs connected, respectively, to said separate outer reels, said springs being wound about said common axis in opposite directions whereby one of said reels is biased for rotation in a direction opposite to that of another of said reels irrespective of the direction of rotation of said reel assembly, and means for rotating said reel assembly in either direction against the bias of said one of said reels.

2. A plural-wire magnetic phonograph comprising, an assembly of reels mounted for rotation about a common axis and each provided with a storage groove and a take-up groove for each wire, a plurality of discrete wire records wound to run between said storage and take-up grooves, said wires being so wound with respect to the direction of the recordings thereon that upon rotation of said reel assembly in one direction one of said wires will run from its storage groove to its take-up groove and the other of said wires will run from its take-up groove to its storage groove, and upon rotation of said reel assembly in the opposite direction said first mentioned wire will run from its take-up groove to its storage groove and said second mentioned wire will run from its storage groove to its take-up groove, whereby at the start of either of said reeling movements one of said wire-recordings is wound in its storage groove in a position to be played.

3. The invention as set forth in claim 2 and wherein said wire records contain the same recording, whereby said recording may be replayed immediately.

4. A plural record magnetic-phonograph comprising a reel assembly comprising a plurality of grooved reels all mounted for independent rotation about a common axis, the total number of grooves in said reels being greater than the number of reels in said assembly, certain of said grooves comprising storage grooves for a plurality of discrete flexible magnetic-records and the other ones of said grooves comprising take-up grooves for individual ones of said records, a plurality of magnetic-transducers, one for each record, mounted in spaced relation with respect to said reels, means for guiding said discrete flexible-records from said storage grooves to separate ones of said magnetic-transducers and thence to the take-up grooves which are individual to said records, means for moving said flexible-records substantially simultaneously along their separate paths, and means for selectively energizing said transducers.

5. The invention as set forth in claim 4 and wherein said reel assembly comprises three reels, the outer ones of said reels being each provided with a storage-groove for one record and the inner reel being provided with a plurality of take-up grooves each individual to one of said records.

TERRY M. SHRADER.

REFERENCES CITED

The following references are of record in the file of this patent:

UNITED STATES PATENTS

| Number | Name | Date |
|---|---|---|
| 372,260 | Griswold | Oct. 25, 1887 |
| 773,985 | Reis | Nov. 1, 1904 |
| 1,718,355 | Hutchison | June 25, 1929 |
| 2,080,812 | Fairbanks | May 18, 1937 |
| 2,097,518 | Franz | Nov. 2, 1937 |
| 2,243,624 | Gazet | May 27, 1941 |
| 2,349,018 | Tasker | May 16, 1944 |
| 2,351,005 | Camras | June 13, 1944 |
| 2,331,008 | Camras | June 13, 1944 |

FOREIGN PATENTS

| Number | Country | Date |
|---|---|---|
| 313,672 | Great Britain | June 20, 1929 |
| 585,406 | Germany | Oct. 3, 1933 |
| 633,160 | Germany | July 21, 1936 |
| 641,843 | Germany | Feb. 15, 1937 |